(12) United States Patent
Yakupov et al.

(10) Patent No.: US 12,249,734 B2
(45) Date of Patent: Mar. 11, 2025

(54) SEPARATORS WITH LAYERED DOUBLE HYDROXIDES FOR ELECTROCHEMICAL CELLS

(71) Applicant: PHINERGY LTD., Kfar Sabba (IL)

(72) Inventors: Ilya Yakupov, Rehovot (IL); Nicola Menegazzo, Pittsburgh, PA (US); Mark Weaver, Greenwell Springs, LA (US)

(73) Assignee: PHINERGY LTD., Kfar Sabba (IL)

( * ) Notice: Subject to any disclaimer, the term of this patent is extended or adjusted under 35 U.S.C. 154(b) by 651 days.

(21) Appl. No.: 17/295,491

(22) PCT Filed: Nov. 6, 2019

(86) PCT No.: PCT/IL2019/051214
§ 371 (c)(1),
(2) Date: May 20, 2021

(87) PCT Pub. No.: WO2020/105028
PCT Pub. Date: May 28, 2020

(65) Prior Publication Data
US 2021/0399383 A1    Dec. 23, 2021

Related U.S. Application Data

(60) Provisional application No. 62/770,778, filed on Nov. 22, 2018.

(51) Int. Cl.
| | |
|---|---|
| *H01M 50/431* | (2021.01) |
| *C01F 7/162* | (2022.01) |
| *C01F 7/785* | (2022.01) |
| *H01M 50/403* | (2021.01) |
| *H01M 50/417* | (2021.01) |
| *H01M 50/426* | (2021.01) |
| *H01M 50/443* | (2021.01) |
| *H01M 50/451* | (2021.01) |
| *H01M 50/497* | (2021.01) |

(52) U.S. Cl.
CPC .......... *H01M 50/431* (2021.01); *C01F 7/162* (2013.01); *C01F 7/785* (2022.01); *H01M 50/403* (2021.01); *H01M 50/417* (2021.01); *H01M 50/426* (2021.01); *H01M 50/443* (2021.01); *H01M 50/451* (2021.01); *H01M 50/497* (2021.01); *C01P 2002/22* (2013.01)

(58) Field of Classification Search
None
See application file for complete search history.

(56) References Cited

U.S. PATENT DOCUMENTS

| | | | | |
|---|---|---|---|---|
| 6,383,270 | B1 * | 5/2002 | Miyazawa | C23C 18/1216 106/287.34 |
| 9,029,002 | B2 | 5/2015 | Nishikawa et al. | |
| 9,190,696 | B2 | 11/2015 | He et al. | |
| 10,020,480 | B2 | 7/2018 | Fujisaki et al. | |
| 2001/0014420 | A1 * | 8/2001 | Takeuchi | H01G 11/82 428/425.5 |
| 2003/0039887 | A1 * | 2/2003 | Yun | H01M 4/131 429/218.1 |
| 2014/0315099 | A1 | 10/2014 | Yamada et al. | |
| 2015/0024292 | A1 | 1/2015 | Yamada et al. | |
| 2015/0030933 | A1 | 1/2015 | Goetzen et al. | |
| 2015/0325828 | A1 | 11/2015 | Herle et al. | |
| 2016/0141582 | A1 * | 5/2016 | Fujisaki | H01M 50/403 427/532 |
| 2016/0218356 | A1 | 7/2016 | Paulsen et al. | |
| 2016/0254511 | A1 * | 9/2016 | Hatta | B60L 50/64 307/10.1 |
| 2016/0365559 | A1 * | 12/2016 | Yoshimaru | H01M 50/417 |
| 2017/0229742 | A1 | 8/2017 | Aykol et al. | |
| 2021/0399305 | A1 | 12/2021 | Huang et al. | |

FOREIGN PATENT DOCUMENTS

| | | |
|---|---|---|
| CN | 106163990 A | 11/2016 |
| CN | 106716706 A | 5/2017 |
| CN | 108172906 | 6/2018 |
| EP | 2 953 191 | * 12/2015 |

(Continued)

OTHER PUBLICATIONS

Machine translation of WO 2017/221498, published on Dec. 26, 2017 (Year: 2017).*
Machine translation of JP 2011-210413, published on Oct. 20, 2011 (Year: 2011).*
Machine translation of WO2012/018133, published on Feb. 9, 2012 (Year: 2012).*
Search Report dated Jul. 28, 2022 for corresponding European Application No. 19887132.9.
International Search Report dated Jan. 14, 2020 for corresponding application No. PCT/IL2019/051214.

(Continued)

*Primary Examiner* — Anca Eoff
(74) *Attorney, Agent, or Firm* — PEARL COHEN ZEDEK LATZER BARATZ LLP

(57) ABSTRACT

Separators, electrochemical cells and methods are provided, to improve operation of cells such as metal-ion batteries and fuel cells. Separators comprise a porous, ionically conductive film including layered double hydroxide(s) (LDHs), which are functional ceramic additives, removing potentially harmful anions from the electrolyte by incorporating them into the LDH structure of positively-charged sheets with intermediary anions. For example, anions which are electrolyte decomposition products or cathode dissolution products may be absorbed into the LDH to prevent them from causing damage to the cell and shortening the cell's life. LDHs may be incorporated in the separator structure, coated thereupon or otherwise associated therewith. Additional benefits include dimensional stability during thermal excursions, fire retardancy and impurity scavenging.

15 Claims, 2 Drawing Sheets

(56) References Cited

FOREIGN PATENT DOCUMENTS

| EP | 3 015 430 | | 5/2016 | |
|---|---|---|---|---|
| EP | 3 041 080 | | 7/2016 | |
| JP | 2011-210413 | * | 10/2011 | |
| JP | 2016225297 A | | 12/2016 | |
| JP | 2018073618 A | | 5/2018 | |
| WO | WO-2012018133 A1 | * | 2/2012 | ......... H01M 2/1653 |
| WO | WO 2017/221498 | * | 12/2017 | |

OTHER PUBLICATIONS

Doron Aurbach; Design of electrolyte solutions for Li and Li-ion batteries: a review; Jan. 30, 2004; Elsevier; Science Direct; www.Sciencedirect.com.

Aurélie Guéguen; Decomposition of LiPF6 in High Energy Lithium-Ion Batteries Studied with Online Electrochemical Mass Spectrometry; Journal of The Electrochemical Society, 163 (6) A1095-A1100 (2016); Published Mar. 29, 2016.

* cited by examiner

*200*

| 210 | Incorporating layered double hydroxide(s) (LDHs) into the ionically conductive separator of an electrochemical cell, to absorb anions present in the electrolyte of the cell |

| 220 | Coating the separator with LDH(s) |

| 222 | Binding LDH particles to the separator |

| 224 | Mixing LDH particles into polymer used to form the separator |

| 226 | Attaching LDH sheet(s) to the separator |

| 230 | Forming electrochemical cells that incorporate the LDH-containing separators |

*Figure 2*

SEPARATORS WITH LAYERED DOUBLE HYDROXIDES FOR ELECTROCHEMICAL CELLS

CROSS-REFERENCE TO RELATED APPLICATIONS

This application is a National Phase Application of PCT International Application No. PCT/IL2019/051214, International Filing Date Nov. 6, 2019, claiming the benefit of U.S. patent application Ser. No. 62/770,778, filed Nov. 22, 2018 which is hereby incorporated by reference.

BACKGROUND OF THE INVENTION

1. Technical Field

The present invention relates to the field of energy storage devices, and more particularly, to the use of functional ceramics in separators for electrochemical devices including batteries and fuel cells.

2. DISCUSSION OF RELATED ART

Separators are used in battery assemblies to provide a physical separation between the anode and cathode materials, preventing direct contact that may result in an electrical short circuit and potential battery failure. At the very least, separator failure will cause the battery to cease to function as an energy source under these circumstances.

Conventionally, separators are composed of porous polyethylene (PE) and/or polypropylene (PP). In the event of a thermal excursion (in the range of 135° C.-170° C. in a typical battery, which may occur as a result of overcharging for example), these materials undergo a phase transition, softening and filling the pores, effectively, and permanently, shutting down the cell. This feature provides a built-in safety mechanism reducing the potential for catastrophic failure of the battery assembly. However, separator materials adapted to withstand such thermal excursions would be a desirable advance in the art.

Under circumstances of extreme physical abuse of the cell (e.g., cell puncture) the associated high thermal release will result in degradation and shrinkage of the PE/PP separator. At this stage, the separator ceases to function to physically separate the cell electrodes, potentially leading to a short circuit and the aforementioned failure to function as an energy source.

Ceramic additives have been included in the formulation of PE and PP separators in order to provide enhanced puncture resistance and reduce shrinkage during thermal excursions, effectively reducing the potential to short circuit and cause the resultant failure to function as an energy source. These composite materials are often referred to as "ceramic separators". To date, several ceramic additives have been reported, including $Al_2O_3$, $AlO(OH)$, $MgAl_2O_4$, $CaCO_3$ and $MgO$. Of the ceramics listed, $Al_2O_3$ and $AlO(OH)$ have been reported in current commercial applications.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides a separator for an electrochemical cell, comprising a porous, ionically conductive film including at least one layered double hydroxide (LDH).

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIG. 2 is a high-level flowchart illustrating a method, according to some embodiments of the invention.

DETAILED DESCRIPTION OF THE INVENTION

Figure 1:
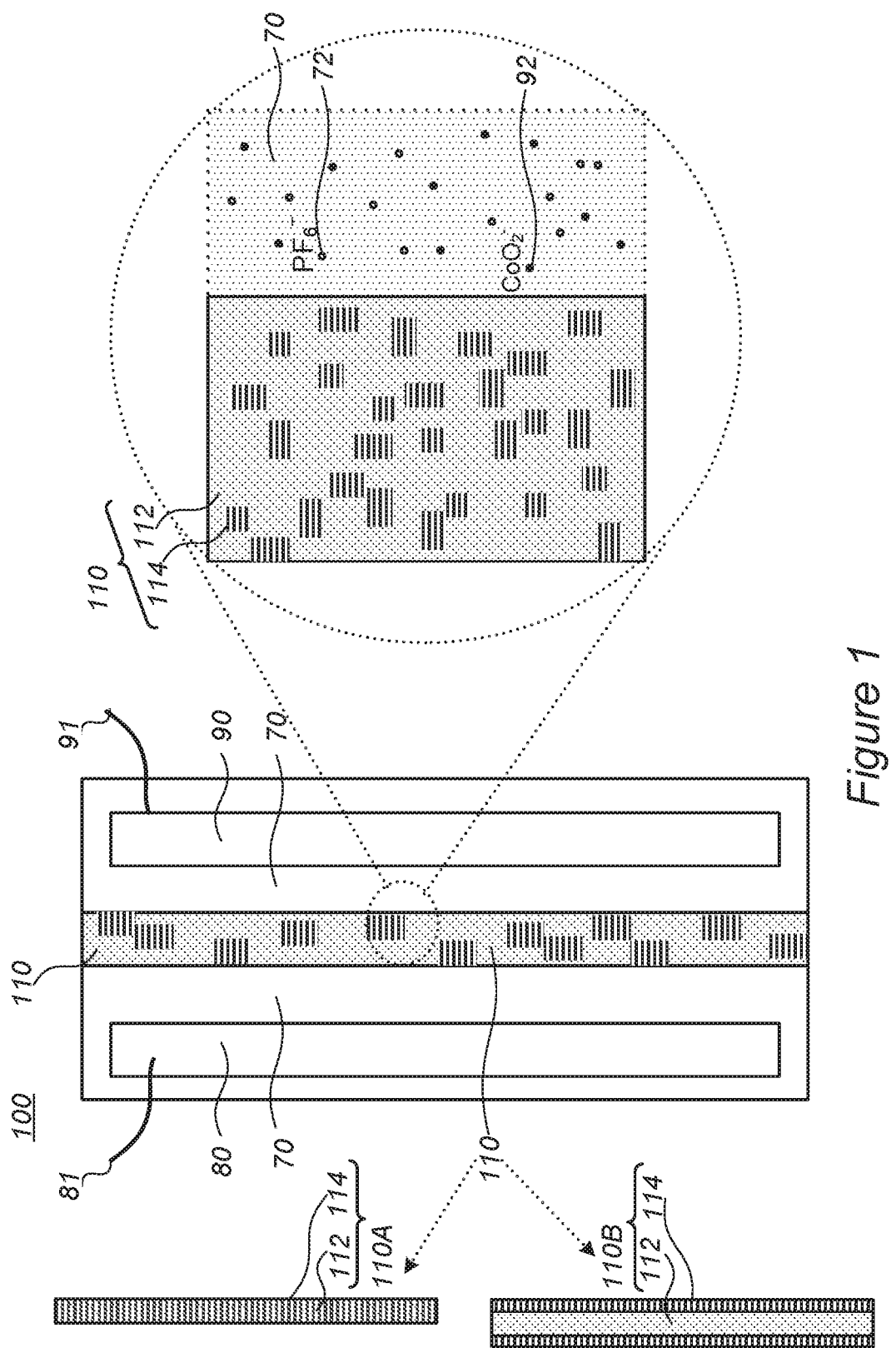
FIG. 1 is a high-level schematic illustration of an electrochemical cell with separator, according to some embodiments of the invention.

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein are for the purpose of description and should not be regarded as limiting.

Embodiments of the present invention provide efficient and economical methods and mechanisms for improving electrochemical cells by providing functionally active separators and thereby provide improvements to the technological field of energy storage devices. Separators, electrochemical cells and methods are provided, to improve operation of cells such as metal-ion batteries and fuel cells. Separators comprise a porous, ionically conductive film including layered double hydroxide(s) (LDHs), which are functional ceramic additives, removing potentially harmful anions from the electrolyte by incorporating them into the LDH structure of positively-charged sheets with intermediary anions. For example, anions which are electrolyte decomposition products or cathode dissolution products may be absorbed into the LDH to prevent them from causing damage to the cell and shortening the cell's life. LDHs may be incorporated in the separator structure, coated thereupon or otherwise associated therewith. LDHs as functional ceramic additives may imparts various beneficial properties to the separator, including dimensional stability during thermal excursions, fire retardancy and impurity scavenging. The LDH functional additives add mechanical robustness and dimensional stability compared to conventional polyethylene/polypropylene separators and also interacts with, and responds to, changing environmental conditions, unlike conventional ceramic separators.

It is notes that to date ceramics have only been used as passive additives, that is, they impart specific properties to the separator but do not react to or interact with a changing environment.

In contrast to the ceramics to date, the ceramics in the separator according to the invention are functional. Thus, in certain embodiments, separators for electrochemical cells (e.g., batteries and fuel cells) are provided, which comprise a porous, ionically conductive film including a layered double hydroxide (LDH) ceramic adapted to absorb anions present in the electrochemical cell and in particular electrolyte decomposition products. For example, LDH(s) may be added to absorb and/or sequester harmful or deleterious anions produced inside the battery.

In embodiments, the electrochemical cell may be a Li-ion battery and the LDH absorbs halogen, e.g., fluoride, anion species generated by side reactions involving an electrolyte of the Li-ion battery, such as a reaction involving organic carbonates and/or lithium salts in the electrolyte or produced at the cathode of a Li-ion battery. LDHs may also neutralize and sequester acids such as HF that may be produced by degradation of the battery electrolyte (as occurs, e.g., when adding LDHs such as hydrotalcite to PVC, polyvinyl chloride, to scavenge/neutralize residual HCl from the polymerization process).

The LDH may be incorporated into the separator in a variety of ways, as described below. The electrochemical cell may include battery types such as Li-ion, Na-ion, Na—S, Mg-ion, Al-ion, and generally battery types which have electrolyte with lithium salts such as $LiPF_6$, which decompose to leave potentially harmful species, e.g., $PF_6^-$, in the electrolyte, which the LDH may consumes and remove from the electrolyte.

Providing a physical barrier between the two electrodes is the ultimate purpose for separators, however the separator materials must also display a variety of additional properties. Thus, separators according to the invention should be porous (generally having porosity in a range of about 30%-60%), have high ionic conductivity, and remain electrochemically stable within the battery's operating potential range. Further, the separator must be chemically compatible with the solvent and electrolyte used, be wettable by the solvent and display high bulk puncture strength in a thin film form factor (which may be less than about 50 µm, or on the order of 25 µm, or less). Finally, in embodiments, the separator should be mechanically flexible thereby enabling its use in typical battery designs, including, without limitation, "jelly roll" battery designs.

FIG. 1 is a high-level schematic illustration of an electrochemical cell 100 with separator 110, according to some embodiments of the invention. Cell 100 is illustrated schematically, in a non-limiting manner as a battery 100 having enclosed anode(s) 80 and cathode(s) 90 with corresponding contacts 81, 91, in electrolyte 70 with separator 110 enabling the conduction of ions between anode(s) 80 and cathode(s) 90 upon charging and discharging of battery 100. Separator 110 is illustrated schematically as comprising LDH 114 and polymer 112 in a range of configurations, such as particulate filler 114 in (polymer) matrix 112 of separator 110, as LDH sheet 114 with LDH dispersed in binder 112 (binder compounds may be various, as disclosed below) of separator 110A, as LDH coating 114 upon polymer 112 of separator 110B. In certain embodiments, LDH may be coated on the cell's electrodes, e.g., on anode(s) 80 and/or cathode(s) 90.

FIG. 1 further illustrates schematically the absorption (or neutralization) of anions that may be present in electrolyte 70 such as decomposition products of the lithium salts in electrolyte (represented schematically in a non-limiting manner as $PF_6^-$ 72) and/or dissolved cathode material (represented schematically in a non-limiting manner as $CoO_2^-$ 92).

LDH 114 may be present in separator 110 in a range of amounts between 0.01 wt % and 99 wt %, e.g., providing any of 0.01%, 0.03%, 0.1%, 0.3%, 1%, 3%, 10%, 30%, 90%, 95%, 99% or any intermediate value, of the weight of separator 110. In various embodiments, disclosed LDH materials may be incorporated in any amount from less than 1 w % to greater than 99 w % of the separator layer. The LDH materials may be combined with existing organic and inorganic materials (e.g., PE, PP, FEP, $Al_2O_3$, AlOOH), or used as the only separator material, with separator 110 consisting of 100% one or more LDHs. When used in combination with existing materials, the LDH component may be added as a particulate solid to the polymer or inorganic materials used to form separator 110. The LDH(s) may also be incorporated as a thin film or coating with existing separator materials. When used as the only separator material, the LDH may incorporate a binder material (e.g., PVA, Poly(vinyl alcohol)) to allow formation of a mechanically durable thin film or sheet layer. The LDH material may be used in the as-produced particulate form or after heat treatment.

In an electrochemical cell according to the invention, the layered double hydroxides (LDHs) are functional ceramic additives. LDHs represent a class of natural and synthetic minerals composed of dissimilarly charged mixed metal cations and intercalated anions providing the required charge balance. Typically, LDHs comprise lamellar (layered) inorganic solids with a brucite ($Mg(OH)_2$)-like structure, having positive sheet charge due to partial substitution of trivalent for divalent cations, which is compensated by anions located between the layers. The mixed metal cations in the LDH may be selected from periods 2, 3 and/or 4 of the periodic table forming any pair or grouping of metals with dissimilar ionic charges, including, without limitation, $Li^+$, $Mg^{2+}$, $Ca^{2+}$, $Zn^{2+}$, $Ni^{2+}$, $Al^{3+}$, $Fe^{3+}$ and $Ti^{4+}$.

When using divalent-trivalent cation pairs, LDHs may be represented using the following chemical formula: $[M^{2+}_{1-x} N^{3+}_x(OH^-)_2]^{x+}[(X^{n-})_{x/n} \cdot yH_2O]^{x-}$, wherein $M^{2+}$ represents a divalent cation (e.g., $Be^{2+}$, $Mg^{2+}$, $Ca^{2+}$, $Cr^{2+}$, $Mn^{2+}$, $Fe^{2+}$, $Co^{2+}$, $Ni^{2+}$, $Cu^{2+}$, $Zn^{2+}$), $N^{3+}$ represents a trivalent cation (e.g., $Al^{3+}$, $Cr^{3+}$, $Mn^{3+}$, $Fe^{3+}$, $Co^{3+}$, Nin, possibly of the same element as M, X' represents intercalating n-valent anion, or anions (e.g., $OH^-$, $Cl^-$, $Br^-$, $F^-$, $CO_3^{2-}$, $NO_3^-$, $SO_4^{2-}$, $SeO_4^{2-}$) with n being an integer, x represents a fixed-composition phase parameter which may be between 0 and 1, e.g., between ⅕ and ⅓, or possibly larger than ½, and y represent the level of hydration.

In certain embodiments, LDHs may comprise monovalent cations such as $Li^+$, e.g., as in $[Li^+Al_2^{3+}(OH^-)_2]^+[Li^+Al_2^{3+}(X^{6-}).yH_2O]^-$, with $X^{6-}$ representing anion(s) with −6 total charge. The value of y is typically between 0.5 and 4.

In certain embodiments, LDHs may comprise embedded tetravalent cations such as $Ti^{4+}$, e.g., as in any of $TiO_2$ LDH, $Ti^{4+}$ functionalized Mg/Al LDH, Ni/Ti LDH, Cu/Ti LDH, Zn/Ti LDH, Li/Ti LDH, Ni/Co/Ti LDH, etc. Other examples include Zn/Ce and Zn/Cr LDHs. In various embodiments, $Ti^{4+}$ or other tetravalent cations may at least partly replace any of the disclosed LDH cations. Certain embodiments may comprise $Si^{4+}$ or possibly $Zr^{4+}$ as tetravalent cations replacing some of the disclosed LDH cations.

In some embodiments, disclosed LDHs may be represented by the formula $(M^{2+}{}_aN^{3+}{}_b(OH^-)_{2a+3b}).yH_2O$ with a and b being integers; and/or $(M^{2+}{}_aN^{3+}{}_b(OH^-)_{2a+3b-cn})(X^{n-})_c.yH_2O$ with a, b, c and n being integers.

When using monovalent-trivalent cation pair(s), such as $Li^+$ and $Al_3^+$, LDHs may be represented using the following chemical formula: $[M^{1+}{}_{1-x}N^{3+}{}_x(OH^-)_2]^{(2x-1)+}[(X^{n-})_{(2x-1)/n}.yH_2O]^{(2x-1)-}$ wherein $M^{1+}$ represents a monovalent cation (e.g., $Li^+$, possibly $Na^+$, $K^+$, $NH_4^+$, $C_2H_5^+$, etc.), $N^{3+}$ represents a trivalent cation (e.g., $Al^{3+}$, $Cr^{3+}$, $Mn^{3+}$, $Fe^{3+}$, $Co^{3+}$, $Ni^{3+}$), $X^{n-}$ represents intercalating n-valent anion, or anions (e.g., $OH^-$, $Cl^-$, $Br^-$, $F^-$, $CO_3^{2-}$, $NO_3^-$, $SO_4^{2-}$, $SeO_4^{2-}$) with n being an integer, x represents a fixed-composition phase parameter which may be between 0 and 1, e.g., between ⅕ and ⅓, or possibly larger than ½, and y represent the level of hydration.

In some embodiments, disclosed LDHs include, but are not limited to, LDHs that incorporate $Al^{3+}$ and/or $Fe^{3+}$ as one of the cations present in the make-up of the layered structure. The other cation may be any of $Ca^{2+}$, $Mg^{2+}$, $Zn^{2+}$, $Cu^{2+}$, $Fe^{2+}$, $Mn^{2+}$ or $Ni^{2+}$. Without limitation, exemplary LDH structures may include, but are not limited to, $Mg_6Al_2(OH)_{18}.4H_2O$ (Meixnerite) and $Mg_6Al_2(OH)_{16}(CO_3).4H_2O$ (Hydrotalcite).

LDHs may be used in the form of micro- or nano-sized powder and may be incorporated into the ceramic separator in one or more of several ways including, but not limited to: as a filler in a microporous PE/PP separator thin film (see e.g., separator 110 in FIG. 1); as a ceramic layer sandwiched between layers of PE/PP film; as a ceramic coating applied to one, or both, sides of the PE/PP film (see e.g., separator 110B in FIG. 1); as a standalone layer, mechanically bound by an organic binder (see e.g., separator 110A in FIG. 1). The material of film 112 and/or respective binder compounds in the LDH sheet may comprise, as non-limiting examples, any of polytetrafluoroethylene (PTFE), related PFEs (poly-fluoroethylenes), fluorinated ethylene propylene (FEP); polyvinylidene fluoride (PVDF); Poly(vinylidene fluoride-co-hexafluoropropylene) (PVDF-HFP); ethylene vinyl acetate (EVA) and equivalent binders. Alternatively or complementarily, LDH may be used as a layer coated on the surface of the battery electrode(s) so that the battery's cathode and anode are separated after battery assembly.

In embodiments, a separator according to the invention may be incorporated in a Li-ion battery comprising an anode capable of receiving Li ions, such as a graphite anode, a cathode comprising a source of Li ions, such as a metal oxide cathode, and an electrolyte capable of transporting Li ions, which may be a solid electrolyte, and which may comprise a lithium salt in an organic solvent for example. The specifics of the anode, cathode and electrolyte are not material to the invention.

FIG. 2 is a high-level flowchart illustrating a method 200, according to some embodiments of the invention. The method stages may be carried out with respect to cells 100 and separators 110 described above, which may optionally be configured to implement method 200. Method 200 may comprise the following stages, irrespective of their order.

Method 200 comprises incorporating at least one layered double hydroxide (LDH) into an ionically conductive separator of an electrochemical cell, to absorb anions present in an electrolyte of the cell (stage 210). LDHs may be incorporated into separator in various ways, such as coating the separator with LDH (stage 220), binding LDH particles to the separator (stage 222), mixing LDH particles into polymer used to form the separator (stage 224), attaching an LDH sheet to the separator (stage 226) or any other process.

In various embodiments, the LDH may include at least one compound having a formula $[M^{2+}{}_{1-x}N^{3+}{}_x(OH^-)_2]^{x+}[(X^{n-})_{x/n}.yH_2O]^{x-}$, wherein $M^{2+}$ is a divalent cation, and $N^{3+}$ is a trivalent cation; $X^{n-}$ is an anion; $0 \le x \le 1$, $0 \le y$ and n is an integer. In certain embodiments, $M^{2+}$ may be at least one of $Be^{2+}$, $Mg^{2+}$, $Ca^{2+}$, $Cr^{2+}$, $Mn^{2+}$, $Fe^{2+}$, $Co^{2+}$, $Ni^{2+}$, $Cu^{2+}$, $Zn^{2+}$; $N^{3+}$ may be at least one of $Al^{3+}$, $Cr^{3+}$, $Mn^{3+}$, $Fe^{3+}$, $Co^{3+}$, $Ni^{3+}$; $X^{n-}$ may be at least one of $Cl^-$, $Br^-$, $CO_3^{2-}$, $NO_3^-$, $SO_4^{2-}$, $SeO_4^{2-}$; and $x \ge 0.2$. In certain embodiments, the LDH may comprise $Li^+Al_2^{3+}(OH^-)_2]^+[Li^+Al_2^{3+}(X^{6-}).yH_2O]^-$, wherein $X^{6-}$ comprises at least one anion with −6 total charge and y is between 0.5 and 4. LDH may further comprise embedded $Ti^{4+}$.

In various embodiments, the LDH may include at least one compound having a formula $(M^{2+}{}_aN^{3+}{}_b(OH^-)_{2a+3b}).yH_2O$ and/or $(M^{2+}{}_aN^{3+}{}_b(OH^-)_{2a+3b-cn})(X^{n-})_c.yH_2O$ with a, b, c and n being integers, wherein $M^{2+}$ is a divalent cation, $N^{3+}$ is a trivalent cation, and $0 \le y$. For example, $N^{3+}$ may be $Al^{3+}$ and/or $Fe^{3+}$; and $M^{2+}$ may be at least one of $Ca^{2+}$, $Mg^{2+}$, $Zn^{2+}$, $Cu^{2+}$, $Fe^{2+}$, $Mn^{2+}$ and $Ni^{2+}$. In certain embodiments, the LDH may be $Mg_6Al_2(OH)_{18}.4H_2O$ (Meixnerite) and/or $Mg_6Al_2(OH)_{16}(CO_3).4H_2O$ (Hydrotalcite).

In certain embodiments, method 200 may comprise adding LDHs to the electrochemical cell, e.g., in association with anode(s) and/or cathode(s). Method 200 may further comprise forming electrochemical cells (e.g., metal-ion cells, metal-air cells, fuel cells, etc.) that incorporate disclosed LDH-containing separators (stage 230).

Advantageously, disclosed separators and methods improve the mechanical robustness in the form of increased puncture resistance and reduced separator shrinkage upon thermal excursion, comparing to PE/PP film alone and exhibit inherent fire retarding properties associated with heat absorbing and fire suppressing compounds (e.g., water and carbon dioxide) upon exposure to temperatures above 200° C. As the LDH additive is present inside the cell assembly, it functions as a first line of defense against thermal runaway reactions, protecting the remainder of the battery.

Moreover, disclosed separators are advantageous in scavenging of chemical impurities present during original battery assembly or formed during battery operation. Electrolytes in batteries (e.g., lithium-ion) oftentimes utilize fluorinated salts (e.g., $LiPF_6$) which may decompose over time ultimately producing $F^-$ and HF, potentially compromising the integrity of the electrode materials and the solid electrolyte interface and consequently diminishing the operational lifetime of the battery. The disclosed LDHs which are incorporated in the separator may absorb and replace anions within their layered structured, and as a result of incorporating LDHs into separator formulations, immobilizing and neutralizing $F^-$ and HF and thereby increasing the battery's tolerance to contaminants and extending its operational lifetime. LDHs in disclosed separators may also absorb metal anionic impurities resulting from, e.g., partial dissolution of the cathode active material (e.g., $MnO_4^-$, $CoO_2^-$), which may be present in the battery's electrolyte and affect the performance and cycling ability of Li-ion battery anode. Disclosed LDH-including separators may absorb such chemical species, to effectively remove them from the electrolyte.

Advantageously, disclosed separators with LDHs as functional ceramic additives are superior to conventional separators in that they are able to interact with and respond to changing operating conditions (e.g., increased temperature and/or an increased level of impurities). Additional benefits include dimensional stability during thermal excursions, fire retardancy and impurity scavenging.

The description of the foregoing preferred embodiments is not to be considered as limiting the invention, which is defined according to the appended claims. The person of ordinary skill in the art, relying on the foregoing disclosure, may practice variants of the embodiments described without departing from the scope of the invention claimed. A feature or dependent claim limitation described in connection with one embodiment or independent claim may be adapted for use with another embodiment or independent claim, without departing from the scope of the invention.

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A separator for a lithium-ion battery, comprising a porous, ionically conductive film including at least one layered double hydroxide (LDH) that is exposed to an electrolyte of the lithium-ion battery, and absorbs fluorine anions present in the electrolyte to increase the battery's tolerance to contaminants and to extend the battery's operational lifetime, and wherein the LDH comprises $Mg_6Al_2(OH)_{18} \cdot 4H_2O$ (Meixnerite) and/or $Mg_6Al_2(OH)_{16}(CO_3) \cdot 4H_2O$ (Hydrotalcite), wherein the LDH further comprises at least one of:
   at least one compound having a formula $[M^{2+}_{1-x} N^{3+}_x (OH^-)_2]^{x+} [(X^{n-})_{x/n} \cdot yH_2O]^{x-}$, wherein $M^{2+}$ is a divalent cation, and $N^{3+}$ is a trivalent cation; $X^{n-}$ is an anion; $0 \leq x \leq 1$, $0 \leq y$ and n is an integer,
   embedded $Ti^{4+}$,
   at least one compound having a formula $(M^{2+}_a N^{3+}_b (OH^-)_{2a+3b}) \cdot yH_2O$ and/or $(M^{2+}_a N^{3+}_b (OH^-)_{2a+3b-cn})(X^{n-})_c \cdot yH_2O$ with a, b, c and n being integers, wherein $M^{2+}$ is a divalent cation, $N^{3+}$ is a trivalent cation, $X^{n-}$ an intercalating n-valent anion and $0 \leq y$, and/or
   at least one compound having a formula: $[M^{1+}_{1-x} N^{3+}_x (OH^-)_2]^{(2x-1)+} [(X^{n-})_{(2x-1)/n} \cdot yH_2O]^{(2x-1)-}$, wherein $M^+$ is a monovalent cation, and $N^{3+}$ is a trivalent cation; $X^{n-}$ is an anion; $0 \leq x \leq 1$, $0 \leq y$ and n is an integer.

2. The separator according to claim 1, wherein the LDH comprises at least one compound having a formula $[M^{2+}_{1-x} N^{3+}_x (OH^-)_2]^{x+} [(X^{n-})_{x/n} \cdot yH_2O]^{x-}$, wherein $M^{2+}$ is a divalent cation, and $N^{3+}$ is a trivalent cation; $X^{n-}$ is an anion; $0 \leq x \leq 1$, $0 \leq y$ and n is an integer, and wherein $M^{2+}$ is at least one of $Be^{2+}$, $Mg^{2+}$, $Ca^{2+}$, $Cr^{2+}$, $Mn^{2+}$, $Fe^{2+}$, $Co^{2+}$, $Ni^{2+}$, $Cu^{2+}$, $Zn^{2+}$; $N^{3+}$ is at least one of $Al^{3+}$, $Cr^{3+}$, $Mn^{3+}$, $Fe^{3+}$, $Co^{3+}$, $Ni^{3+}$; $X^{n-}$ is at least one of $Cl^-$, $Br^-$, $CO_3^{2-}$, $NO_3^-$, $SO_4^{2-}$, $SeO_4^{2-}$; and $x \geq 0.2$.

3. The separator according to claim 1, wherein the LDH comprises embedded $Ti^{4+}$.

4. The separator according to claim 1, wherein the LDH comprises at least one compound having a formula $(M^{2+}_a N^{3+}_b (OH^-)_{2a+3b}) \cdot yH_2O$ and/or $(M^{2+}_a N^{3+}_b (OH^-)_{2a+3b-cn})(X^{n-})_c \cdot yH_2O$ with a, b, c and n being integers, wherein $M^{2+}$ is a divalent cation, $N^{3+}$ is a trivalent cation, $X^{n-}$ an intercalating n-valent anion and $0 \leq y$.

5. The separator according to claim 4, wherein $N^{3+}$ is $Al^{3+}$ and/or $Fe^{3+}$; $M^{2+}$ is at least one of $Ca^{2+}$, $Mg^{2+}$, $Zn^{2+}$, $Cu^{2+}$, $Fe^{2+}$, $Mn^{2+}$ and $Ni^{2+}$.

6. The separator according to claim 1, wherein the LDH comprises at least one compound having a formula: $[M^{1+}_{1-x} N^{3+}_x (OH^-)_2]^{(2x-1)+} [(X^{n-})_{(2x-1)/n} \cdot yH_2O]^{(2x-1)-}$, wherein $M^+$ is a monovalent cation, and $N^{3+}$ is a trivalent cation; $X^n$ is an anion; $0 \leq x \leq 1$, $0 \leq y$ and n is an integer.

7. The separator according to claim 1, wherein said ionically conductive film comprises a polymer.

8. The separator according to claim 1, wherein the ionically conductive film comprises a porous film of at least one of: polyethylene (PE), polypropylene (PP), Polytetrafluoroethylene (PTFE), a fluoroethylene polymer (PFE), fluorinated ethylene propylene (FEP), polyvinylidene fluoride (PVDF), poly (vinylidene fluoride-co-hexafluoropropylene) (PVDF-HFP), ethylene vinyl acetate (EVA) and combinations thereof.

9. The separator according to claim 1, wherein the LDH is at least one of:
   present as a particulate filler in a matrix on said film,
   coated on said film, and/or
   present as a particulate LDH layer.

10. The separator according to claim 1, wherein the LDH is on a surface of at least one electrode of the lithium-ion battery.

11. A lithium-ion battery, comprising at least one anode and at least one cathode, enclosed with electrolyte and separated by the separator according to claim 1.

12. A separator for an electrochemical cell, comprising a porous, ionically conductive film including at least one layered double hydroxide (LDH), wherein the LDH comprises $Li^+Al_2^{3+}(OH)_2]^+[Li^+Al_2^{3+}(X^{6-})\cdot yH_2O]^-$, wherein $X^{6-}$ comprises at least one anion with −6 total charge and y is between 0.5 and 4.

13. The separator according to claim 12, wherein said ionically conductive film comprises a polymer, and the LDH is at least one of: present as a particulate filler in a matrix on said film, coated on said film, present as a sheet comprising the LDH dispersed in a polymer binder compound of the film, present as a particulate LDH layer and/or on a surface of at least one electrode of the lithium-ion battery.

14. The separator according to claim 12, wherein the ionically conductive film comprises a porous film of at least one of: polyethylene (PE), polypropylene (PP), Polytetrafluoroethylene (PTFE), a fluoroethylene polymer (PFE), fluorinated ethylene propylene (FEP), polyvinylidene fluoride (PVDF), poly(vinylidene fluoride-co-hexafluoropropylene) (PVDF-HFP), ethylene vinyl acetate (EVA) and combinations thereof.

15. A lithium-ion battery comprising at least one anode and at least one cathode, enclosed with electrolyte and separated by the separator according to claim 12.

* * * * *